United States Patent
Duernegger

(10) Patent No.: US 11,167,388 B2
(45) Date of Patent: Nov. 9, 2021

(54) GEARHEAD AND HANDHELD POWER TOOL

(71) Applicant: C. & E. Fein GmbH, Schwaebisch Gmuend-Bargau (DE)

(72) Inventor: Wolfgang Duernegger, Schorndorf (DE)

(73) Assignee: C. & E. Fein GmbH, Schwaebisch Gmuend-Bargau (DE)

( * ) Notice: Subject to any disclaimer, the term of this patent is extended or adjusted under 35 U.S.C. 154(b) by 258 days.

(21) Appl. No.: 16/453,450

(22) Filed: Jun. 26, 2019

(65) Prior Publication Data
US 2019/0389020 A1    Dec. 26, 2019

(30) Foreign Application Priority Data
Jun. 26, 2018 (DE) ..................... 10 2018 115 303.1

(51) Int. Cl.
| | |
|---|---|
| *F16H 57/10* | (2006.01) |
| *B23Q 11/00* | (2006.01) |
| *B24B 23/02* | (2006.01) |
| *B24B 23/08* | (2006.01) |
| *B25F 5/02* | (2006.01) |
| *F16H 35/00* | (2006.01) |

(52) U.S. Cl.
CPC ........ *B23Q 11/0092* (2013.01); *B24B 23/028* (2013.01); *B24B 23/08* (2013.01); *B25F 5/02* (2013.01); *F16H 35/00* (2013.01); *F16H 2035/006* (2013.01)

(58) Field of Classification Search
CPC ....... B23Q 11/0092; B25F 5/00; F16H 35/00; F16H 2035/006
See application file for complete search history.

(56) References Cited

U.S. PATENT DOCUMENTS

| | | |
|---|---|---|
| 9,410,586 B2 | 8/2016 | Esenwein |
| 2002/0066632 A1 | 6/2002 | Kristen et al. |
| (Continued) | | |

FOREIGN PATENT DOCUMENTS

| | | |
|---|---|---|
| DE | 19510291 A1 | 9/1996 |
| DE | 19831542 A1 | 1/2000 |
| (Continued) | | |

OTHER PUBLICATIONS

Machine Translation of EP1961525A1.*

*Primary Examiner* — Jake Cook
(74) *Attorney, Agent, or Firm* — Muncy, Geissler, Olds & Lowe, P.C.

(57) ABSTRACT

A gearhead for a handheld power tool for machining workpieces, having a housing in which an output that can be connected to a drive of a handheld power tool is accommodated, and also having a tool shaft to which a tool can be coupled, wherein a braking device that can be moved between a braking position and a release position and that acts upon the tool shaft is provided for braking of the tool shaft. A switching device is provided that can be moved between a first switching position, in which the tool shaft is connected to the output in a power transmitting manner and in which the braking device is transferred into the release position, and a second switching position, in which the tool shaft is decoupled from the output and in which the braking device is transferred into the braking position.

15 Claims, 7 Drawing Sheets

(56) References Cited

U.S. PATENT DOCUMENTS

| | | | |
|---|---|---|---|
| 2013/0284551 A1* | 10/2013 | Nadig | H02K 7/104 |
| | | | 188/267 |
| 2014/0034434 A1* | 2/2014 | Esenwein | B24B 55/00 |
| | | | 188/267 |
| 2014/0206265 A1* | 7/2014 | Maute | B24B 41/04 |
| | | | 451/358 |
| 2018/0161949 A1* | 6/2018 | Laber | B24B 23/022 |

FOREIGN PATENT DOCUMENTS

| | | |
|---|---|---|
| DE | 102010043186 A1 | 5/2012 |
| DE | 102011005809 A1 | 9/2012 |
| DE | 102016211973 A1 | 1/2018 |
| EP | 0072610 A2 | 2/1983 |
| EP | 1961525 A1 | 8/2008 |
| EP | 2632652 A2 | 9/2013 |

* cited by examiner

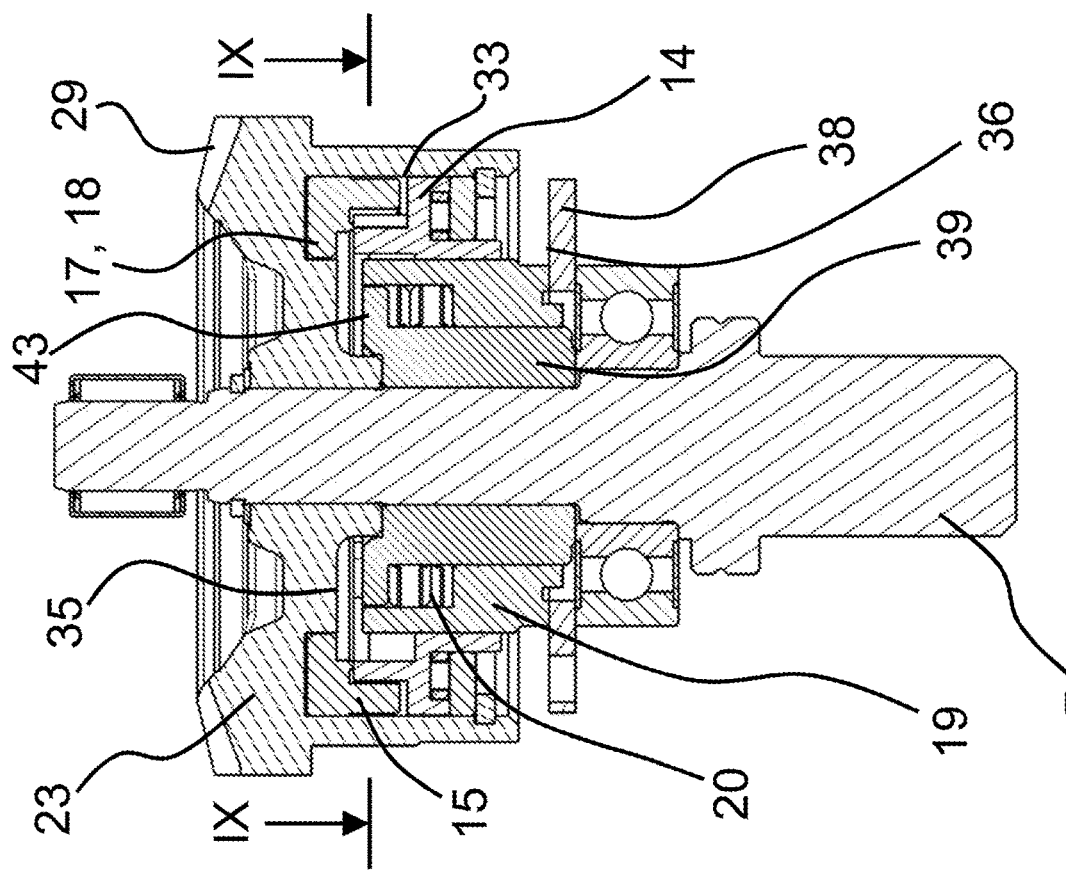
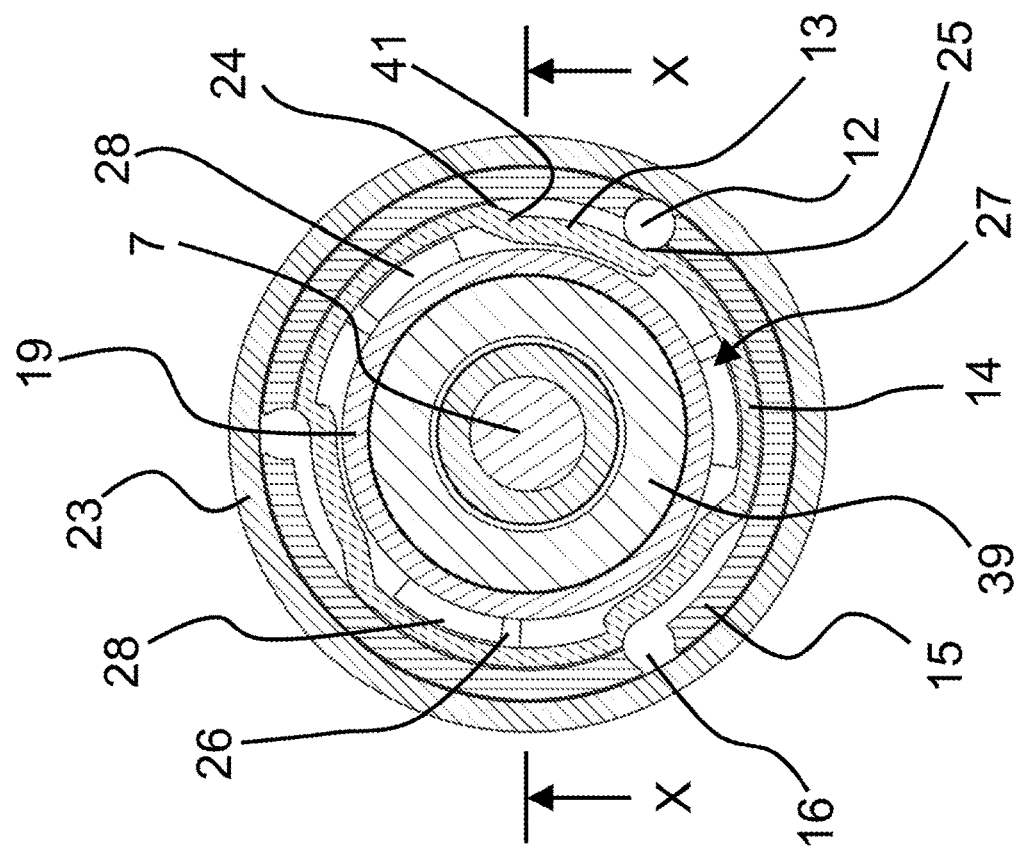

GEARHEAD AND HANDHELD POWER TOOL

This nonprovisional application claims priority under 35 U.S.C. § 119(a) to German Patent Application No. 10 2018 115 303.1, which was filed in Germany on Jun. 26, 2018, and which is herein incorporated by reference.

BACKGROUND OF THE INVENTION

Field of the Invention

The present invention relates to a gearhead for a handheld power tool for machining workpieces, having a housing, in which an output that can be connected to a drive of a handheld power tool is accommodated, and also having a tool shaft to which a tool can be coupled, wherein a braking device that can be moved between a braking position and a release position and that acts upon the tool shaft is provided for braking of the tool shaft. In addition the invention relates to a handheld power tool having a drive and having a gearhead according to the invention.

Description of the Background Art

In handheld power tools, for example in angle grinders, the problem occurs that a tool connected to the tool shaft of the gearhead continues to rotate after the handheld power tool is switched off, and is braked only very slowly by the drive, which has a comparatively high inertia. However, this is associated with a not inconsiderable risk of injury to the user of such a handheld power tool, since the user can injure himself severely on the still rotating tool even when the drive is switched off.

Moreover, the problem exists that when an edge of the tool catches, so-called "kick back" of the handheld power tool frequently occurs, in which the rotating tool of the handheld power tool moves toward the user in an uncontrolled manner, which likewise can lead to serious injury of the user. Despite the fact that handheld power tools in which the drive has a "hold-to-run" design—which is to say, that only run when the appropriate switch is being held by the user—do indeed use braking devices in order to actively brake the tool of the handheld power tool, it is nevertheless the case that the tool is only inadequately braked by the braking device because the drive of the handheld power tool must also always be braked along with the tool, with the result that the risk of serious injury to the user continues to exist.

A gearhead is known from EP 2 632 652 B1, for example, in which a mechanical braking device is provided that can be used as an assembly unit in the gearhead in order to brake the tool shaft when the drive is switched off. However, it has proven extremely disadvantageous here that the tool shaft is always frictionally connected to the drive in the handheld power tool known from EP 2 632 652 B1, so that the braking device ultimately must not only brake the tool connected to the tool shaft, but also the drive itself. Consequently, a comparatively great amount of energy must be dissipated by the braking device. Yet this has the result that the braking device must be designed to be very large. In addition, the brake lining of the braking device must be replaced frequently, which has a detrimental effect on the maintenance needs of the handheld power tool connected to the gearhead.

SUMMARY OF THE INVENTION

It is therefore an object of the present invention to reduce the aforementioned disadvantages and to provide an improved gearhead for a hand-held power tool. It is an additional object of the invention to provide an improved hand-held power tool.

The object relating to the gearhead is attained in an exemplary embodiment according to the invention with a gearhead of the initially mentioned type by the means that a switching device is provided that can be moved between a first switching position, in which the tool shaft is connected to the output in a power transmitting manner and in which the braking device is transferred into the release position, and a second switching position, in which the tool shaft is decoupled from the output and in which the braking device is transferred into the braking position.

A selective coupling of the tool shaft with the output can be achieved through the switching device in this way. In the first switching position of the switching device, the tool shaft is connected to the output in a power transmitting manner, whereas the tool shaft is decoupled therefrom in the second switching position. At the same time, in the first switching position the braking device is transferred into the release position, so that the tool shaft can move with the output and rotate freely. In the second switching position, in contrast, not only is the tool shaft decoupled from the output, but the braking device is also transferred or moved from the release position into the braking position so that the tool shaft, which is decoupled from the output, and the tool connected to the shaft—for example an abrasive disk—are braked, whereas the output does not need to be braked by the braking device. Within the scope of the invention, provision is made in this context that the movement of the braking device between the release position and the braking position takes place simultaneously with the movement of the switching device between the first switching position and the second switching position or afterward in time. Decoupling the tool shaft and the tool connected thereto from the output achieves the result that only components with a comparatively low rotational energy must be braked, whereas the remainder of the drive train, which has a very high rotational energy, can decelerate unbraked. In this regard, between 20% and 30% of the rotational energy of the overall system is located in the braked mass.

It has also proven especially advantageous when the switching device interacts with the output in such a manner that the switching device can be moved between the first switching position and the second switching position by a mechanical switching impulse induced by the output. As a result, a mechanical solution can be used and the implementation and use of an electronic switch can ultimately be dispensed with, with beneficial effects on manufacturing effort. Provision is made here in particular that upon switch-on of the drive of a hand-held power tool equipped with the gearhead according to the invention, and the startup of the output associated therewith, a part of the switching device is carried along, as a result of which the switching device—which is in the second switching position—is transferred from the second switching position into the first switching position due to the mechanical switching impulse induced thereby, via which the tool shaft is coupled to the output and the braking device is released, so that the tool shaft is now connected to the output in a power transmitting manner. When the hand-held power tool is switched off, the tool attached to the tool shaft is then braked more strongly than the output, so that different negative accelerations are present between the tool shaft and the output coupled to the drive, which in turn result in a switching impulse that causes the switching device to be transferred back from the first switching position to the second switching position, as a result of which a decoupling of the tool shaft from the output takes place and the braking device is transferred from the release position into the braking position.

It has also proven successful when the switching device includes at least one radially movable switch, which is accommodated in a control cam that is formed on a freewheel inner ring and that is delimited by a first seat defining the first switching position and a second seat defining the second switching position. The switching of the switching device can be realized especially simply through the use of the at least one switch that is guided in the control cam formed on the freewheel inner ring. In this regard, it has proven especially successful within the scope of the invention when the control cam is designed as a radial control cam, with which the at least one switch can be moved radially. In this context, it has also proven advantageous when the at least one switch is designed as a cylinder, since this can be guided especially easily in the control cam of the freewheel inner ring. The freewheel inner ring is rotatably supported with respect to the housing in this case.

In order to improve the coupling between the output and the switching device in the first switching position in this design, it has proven to be beneficial when the switch located in the first seat in the first switching position is frictionally connected to the output. When the switch is located in the first seat, which is to say when the switching device is in the first switching position, a frictional connection is formed between the output and the switch, and thus with the freewheel inner ring as well, so ultimately the switch is clamped between the first seat and the output. In this design, the first seat can especially preferably have a clamping bevel, via which the strength of the frictional connection can be influenced by the position of the switch on the clamping bevel. If, in contrast, the switch is located in the second seat of the control cam, then the frictional connection between the output and the switch is released, so that a relative rotation between the output and the switching device is possible.

It has also proven especially advantageous when the switching device includes a switching ring that surrounds the freewheel inner ring and that has, on the outer circumferential side, at least one radial opening that provides a retaining function for the at least one switch, through which the at least one switch passes radially in the first switching position. The switching ring thus exerts a retaining function on the switch, which simplifies assembly, in particular. In addition, the face of the switching ring, in particular, can also be brought into contact with the output so that the switching impulse can be transmitted easily from the output to the switching device. Because the openings formed in the switching ring are dimensioned such that the switch can pass through them, but at the same time are retained by them, the switching ring is rotatable relative to the freewheel inner ring only in the angular region defined between the first seat and the second seat of the control cam. During this relative rotation, the at least one switch accommodated in the corresponding opening follows the motion of the switching ring, and in so doing is moved along the control cam between the first seat and the second seat.

The transmission of the switching impulse from the output to the switching device is also improved when a radially inward-pointing overlap section, which especially preferably is designed as an annular shoulder, is associated with the switching ring. As a result, the contact surface between the switching ring and the output can be increased, via which the switching process is improved.

Moreover, it has also proven beneficial when the braking device includes a brake sleeve that is connected to the tool shaft in a rotationally fixed manner and that can be moved axially relative to the tool shaft between the release position and the braking position. As a result, the braking device can be realized in an especially simple manner.

In this context, it has also proven to be useful when a return element is provided that exerts a restoring force on the brake sleeve in the release position of the braking device. Because of the restoring force acting on the brake sleeve in the release position, the result is achieved that when the switching element is being moved from the first switching position into the second switching position, the brake sleeve, and thus the braking device as a whole, are also reliably transferred from the release position into the braking position, which has a positive effect on the operational reliability of the gearhead according to the invention. Within the scope of the invention, it has also proven to be advantageous in this regard when the return element is designed as a set of springs that includes at least one wave spring.

It has also proven beneficial when the switching device has a cam mechanism for moving the braking device between the release position and the braking position. In this way a simple mechanical solution is provided that, moreover, is not failure-prone, which has a positive effect on the maintenance requirements of the gearhead according to the invention. In this context, it has also proven to be especially advantageous when the cam mechanism includes at least one axial drive cam formed on the freewheel inner ring for interacting with a mating cam formed on the brake sleeve. As a result, a radial movement of the switching element and of the freewheel inner ring can be converted into an axial movement of the brake sleeve in a simple manner. The drive cam can preferably be formed on the inner circumferential side on the freewheel inner ring in this design.

It has additionally proven successful when the braking device has a braking surface associated with the housing and an opposite surface associated with the brake sleeve for interacting with the braking surface. Thus, when the braking surface is moved from the release position into the braking position, the opposite surface associated with the brake sleeve comes into contact with the braking surface associated with the housing, via which the braking of the tool shaft is accomplished. In this context it has additionally proven to be advantageous when the braking surface is formed on a brake ring that is connected to the housing in a rotationally fixed manner, which makes it possible to enlarge the contact surface between the braking surface and the opposite surface, which has a positive effect on the braking behavior. Within the scope of the invention, provision is also made here in particular that the brake ring is formed as a single piece with the housing, further reducing assembly effort. Consequently, the braking device ultimately is not created until overall assembly, which is to say when the housing is joined with the remaining parts of the braking device.

The adaptability of the gearhead according to the invention to different hand-held machine tools can be improved by the means that a spacer sleeve forming an axial guide for the brake sleeve is provided that is connected to the tool shaft in a rotationally fixed and axially immovable manner. Moreover, the return element can be accommodated between the brake sleeve and the spacer sleeve, via which an especially compact gearhead is created.

It has also proven to be beneficial when the output includes a transmission having a bevel-gear drive and a bevel gear. In this way, it is possible to change the direction of the output in a simple manner—for example, in a gearhead for an angle grinder. In particular, in this design it is possible for the control device to interact with the bevel gear of the transmission, wherein the bevel gear in this case preferably is cup-shaped in design and has a base as well as an axial section with whose inner wall the at least one switching element forms a frictional connection in the first switching position. The above-described advantage with regard to the rotational energy to be braked is increased as a result of the use of the transmission, since the drive or the electric motor rotates faster than a tool attached to the tool shaft because of the reduction ratio of the transmission, which preferably is 3.73.

It has also proven to be beneficial when the ratio of the moment of inertia of the braked mass to the moment of inertia of the unbraked mass is greater than 0.8:1, especially preferably is greater than 1:1 and is less than 10:1. In this context, the moment of the tool fastened to the tool interface is also explicitly included in the moment of inertia of the braked mass. The braking device can be matched to the moment of inertia.

The object relating to the handheld power tool is attained according to the invention by a handheld power tool having a drive and also having a gearhead according. In this way, a handheld power tool is provided, in particular, whose tool shaft can be braked rapidly and for which the maintenance requirement is reduced.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 9 is a cross-section through the switching device of the gearhead in a second switching position;

FIG. 10 is a longitudinal section through the switching device in the second switching position.

DETAILED DESCRIPTION

Figure 1:
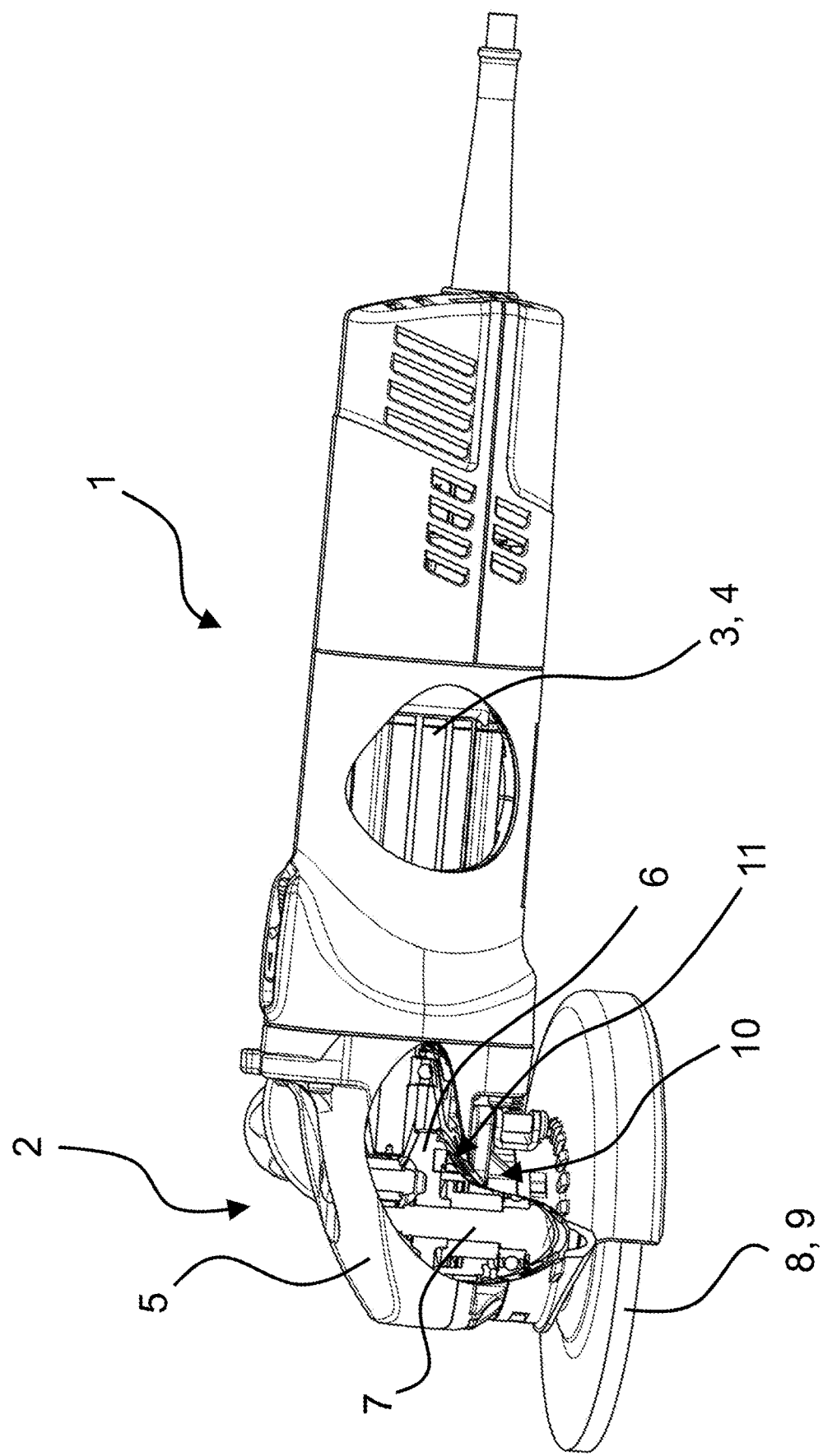
FIG. 1 is a partial section of a handheld power tool.

FIG. 1 shows, in a partially sectional view, a handheld power tool 1 that has a gearhead 2 and a drive 3, which is designed as an electric motor 4. The gearhead 2 in this design has a housing 5, in which is accommodated an output 6 that is coupled to the drive 3. Likewise located in the housing 5 is a tool shaft 7, to which is coupled a tool 8, which is designed as an abrasive disk 9 in the exemplary embodiment shown. Likewise visible in FIG. 1 is a braking device 10, which acts on the tool shaft 7 and can be moved between a braking position and a release position. In addition, a switching device 11 is provided, which can be moved between a first switching position, in which the tool shaft 7 is connected to the output 6 in a power transmitting manner and in which the braking device 10 is in the release position, and a second switching position, in which the tool shaft 7 is decoupled from the output 6 and in which the braking device 10 is transferred into the braking position.

Figure 2:
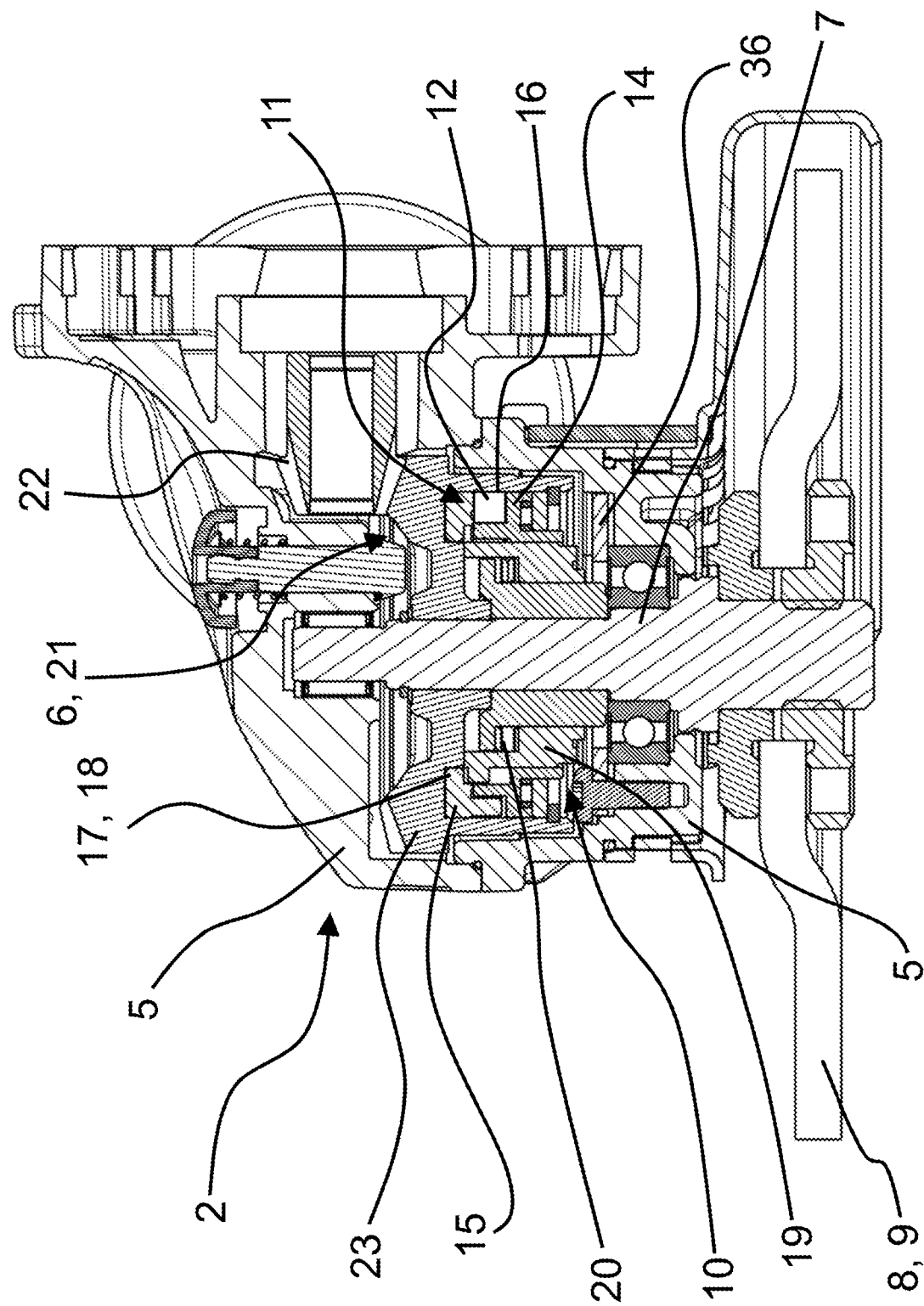
FIG. 2 is a sectional view through a gearhead of the hand-held power tool.

FIG. 2 shows the gearhead 2 in a sectional view. Here it can be seen, in particular, that the switching device 11 includes a radially movable switch 12, which is accommodated in a control cam 13 that is formed on a freewheel inner ring 14. The freewheel inner ring 14 is surrounded by a switching ring 15, which has, on the outer circumferential side, radial openings 16 through which the switch 12 can pass radially to the outside in the first switching position. The switching ring 15 in this design has a radially inward-pointing overlap section 17, which is designed as an annular shoulder 18. In the exemplary embodiment shown, the braking device 10 includes a brake sleeve 19, which is acted upon by a return element 20 such that a restoring force acting in the braking direction acts on the brake sleeve 19 in the release position of the braking device 10. The brake sleeve 19 in this case is connected to the tool shaft 7 in a rotationally fixed manner and is axially movable relative thereto between the release position and the braking position. The output 6 has a transmission 21, which is composed of a bevel-gear drive 22 and a bevel gear 23.

Figure 3:
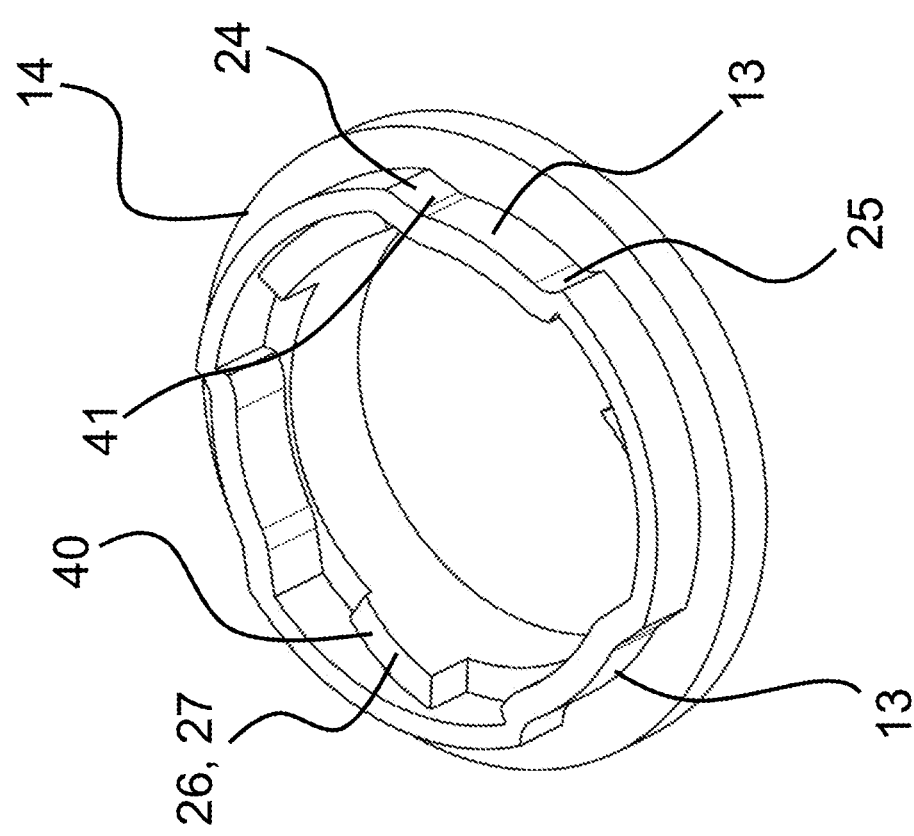
FIG. 3 is a perspective view of a freewheel inner ring of a switching device of the gearhead.

FIG. 3 shows, in a perspective view, the freewheel inner ring 14 with the control cams 13 formed therein, in each of which is accommodated one of the three switch 12 provided in the exemplary embodiment shown. Each of the control cams 13 is delimited by a first seat 24, which defines the first switching position, and by a second seat 25, which the second switching position is defined by. The first seat 24 differs in this design from the second seat 25 in that the switch 12 located in the first seat 24 is moved radially outward further than a switch 12 located in the second seat 25. Moreover, the first seat 24 has a clamping bevel 41, through which the strength of the frictional connection is influenced. On the inner circumferential side, the freewheel inner ring 14 has axial drive cams 26, which are part of a cam mechanism 27 with which the braking device 10 can be moved between the release position and the braking position, as is explained in detail with reference to FIGS. 5 and 7 to 10.

Figure 4:
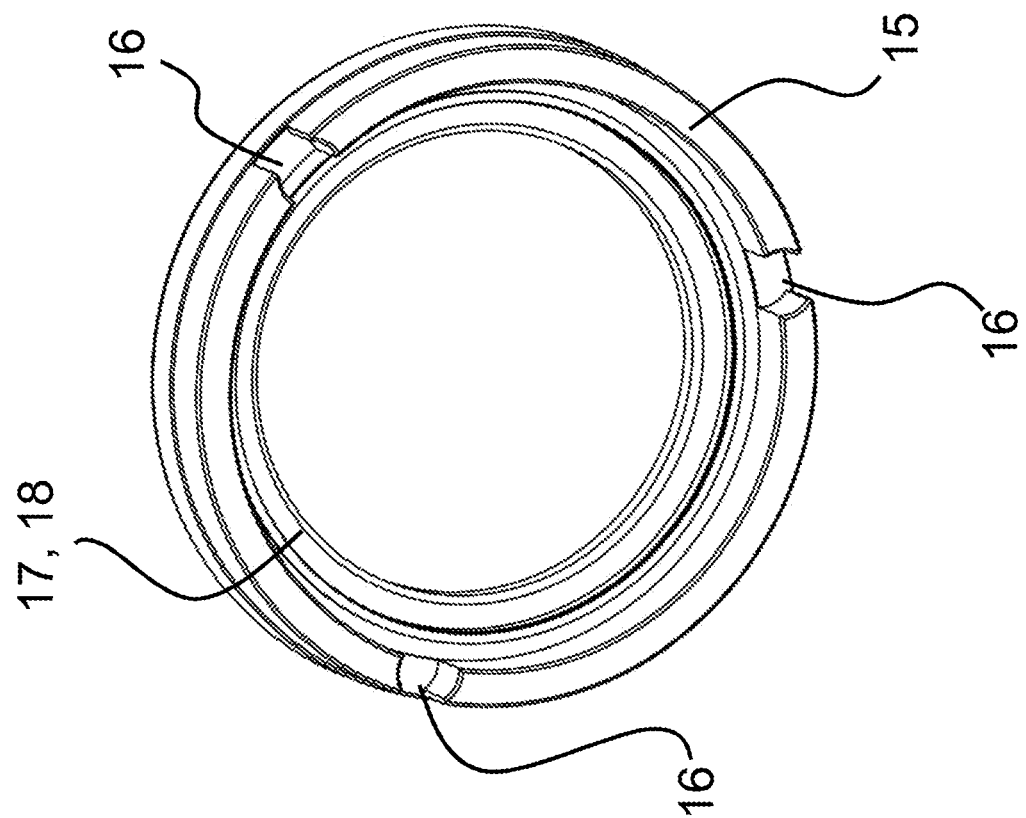
FIG. 4 is a perspective view of a switching ring of the switching device.

Visible in FIG. 4 is the switching ring 15, which has, uniformly distributed over the outer circumference, three openings 16 through which the three switch 12 implemented as cylinders that are guided in the control cams 13 of the freewheel inner ring 14 can pass radially to the outside. The openings 16 are designed here such that a retaining function is always exerted on the switch 12 by them. Also evident is the overlap section 17, which is implemented in the exemplary embodiment shown as the annular shoulder 18 and simplifies assembly, but which also promotes the transmission of the switching impulse from the output 6 to the switching device 11.

Figures 5, 6:
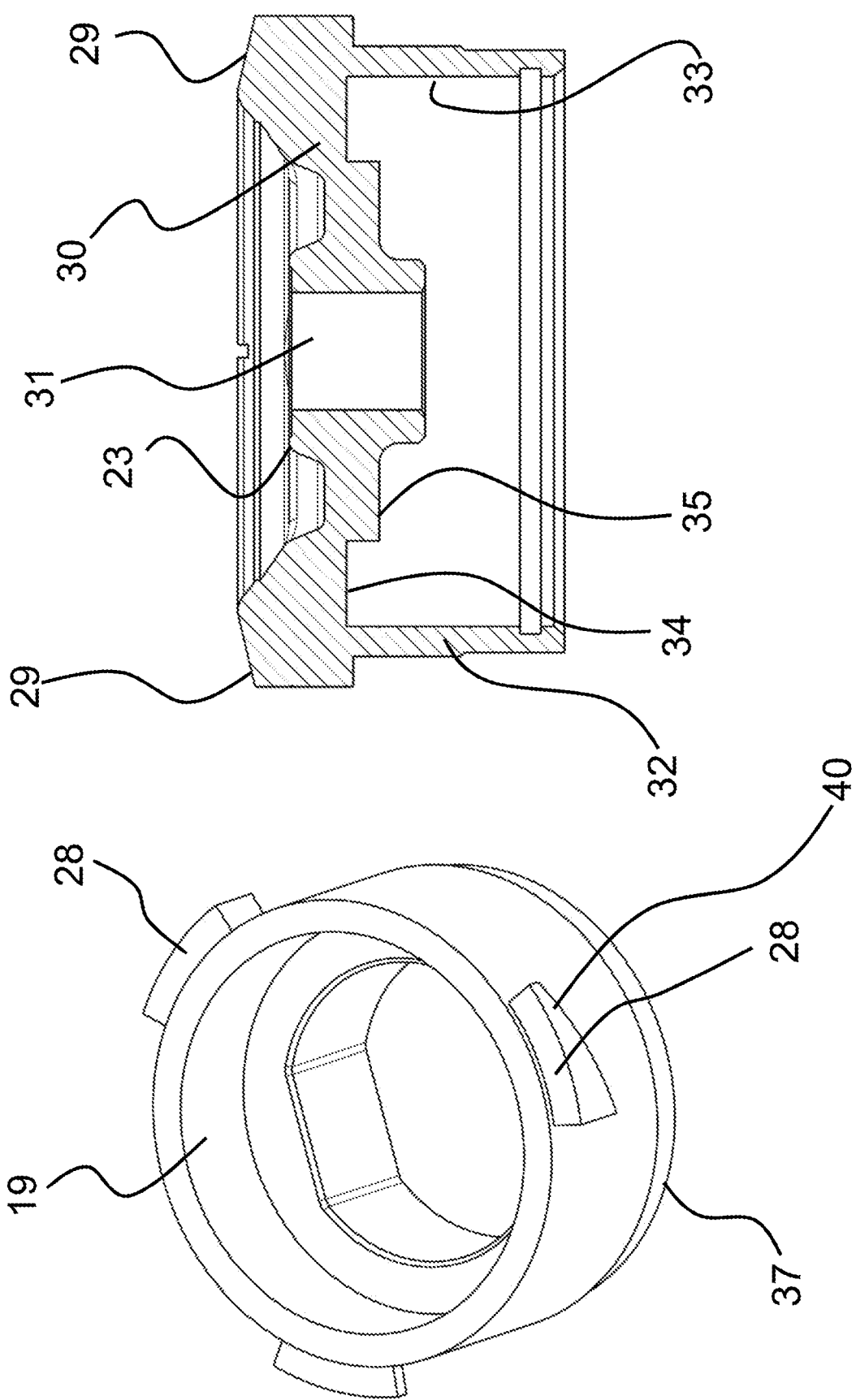
FIG. 5 is a perspective view of a brake sleeve of a braking device.
FIG. 6 is a sectional view of a bevel gear of an output of the gearhead.

FIG. 5 shows, likewise in a perspective view, the brake sleeve 19 of the braking device 10. On the outer circumferential side, this has mating cams 28, which interact with the drive cams 26 of the freewheel inner ring 14 in order to move the brake sleeve 19 axially with respect to the tool shaft 7 when the switching device 11 is transferred from the first switching position into the second switching position.

FIG. 6 shows, in a sectional view, the bevel gear 23 of the transmission 21, which is part of the output 6. The bevel gear 23 in this case has a cup-like shape with a base 30 and an axial section 32, and, on the outside of the base 30, includes gear teeth 29 that mesh with the bevel-gear drive 22 of the transmission 21. Formed in the center of the base 30 of the bevel gear 23 is a bushing 31, in which the tool shaft 7 is rotatably supported. In addition, the axial section 32 of the bevel gear 23 that is shown in FIG. 6 has an inner wall 33, against which the switch 12 is radially moved in the first switching position in order to form a frictional connection. Arranged concentrically to one another on the inside of the base 30 are an annular surface 34—which the face of the switching ring 15 that faces away from the freewheel inner ring 14 is slightly spaced apart from—and an annular contact surface 35 is formed against which the brake sleeve 19 is moved axially in the release position of the braking device 10.

Figure 8:
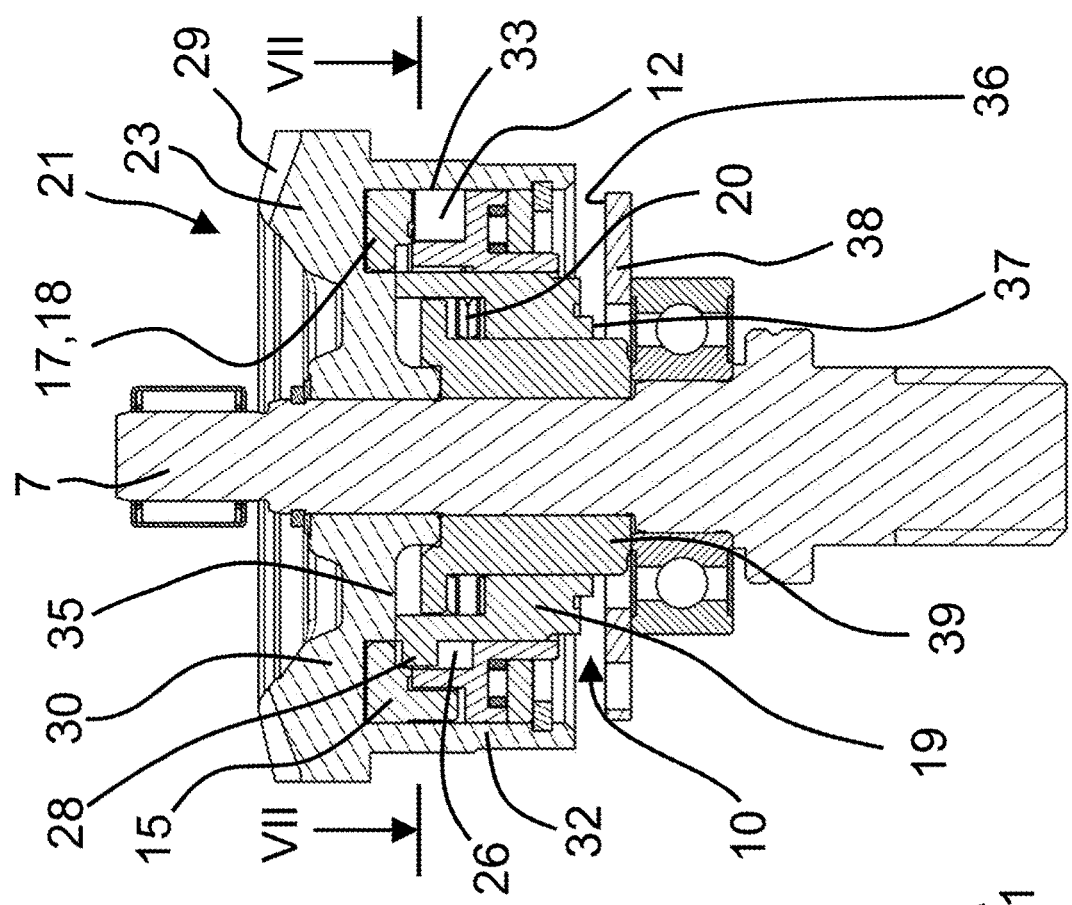
FIG. 8 is a longitudinal section through the switching device in the first switching position.
Figure 7:
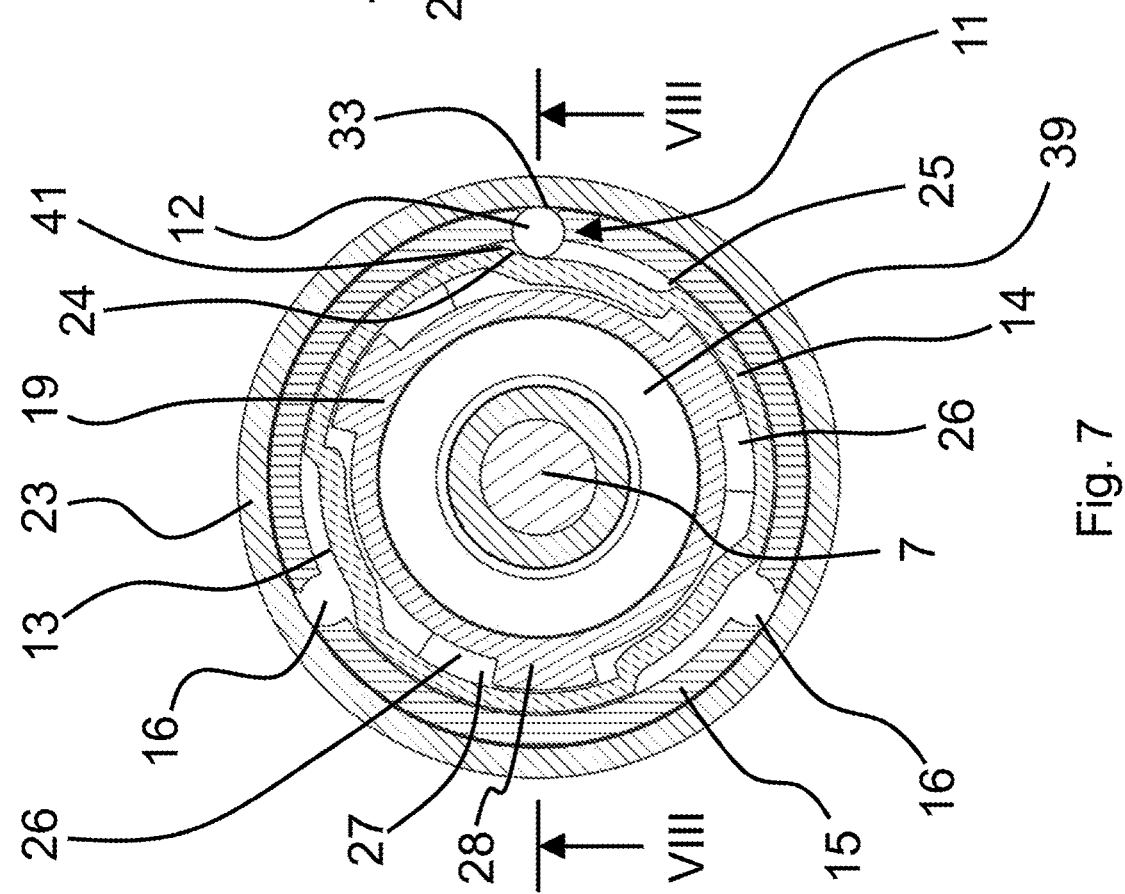
FIG. 7 is a cross-section through the switching device of the gearhead in a first switching position.

The function of the switching device 11 and of the braking device 10 is explained in detail below on the basis of FIGS. 7 to 10; FIGS. 7 and 8 show the switching device 11 in the first switching position with released braking device 10, while in FIGS. 9 and 10, the switching device 11 is in the second switching position and the braking device 10 is in the braking position.

FIG. 7 and FIG. 8 show a cross-section and a longitudinal section through a part of the gearhead 2, the switching device 11 of which is located in the first switching position here, which is to say the position in which the tool shaft 7 is connected to the bevel gear 23 of the output 6 in a rotationally fixed manner by means of a frictional connection and in which the braking device 10 is in the open position, or in other words is axially moved away from the brake ring 38 in opposition to the force of the return element 20. As is visible in FIG. 7 in this regard, the switch 12, of which three are provided but only one is shown for reasons of clarity, is located in this drawing in the first seat 24, which defines the first switching position. In this drawing, the switch 12 is moved radially outward against the inner wall 33 of the axial section 32 of the bevel gear 23 by the clamping bevel 41, and forms a frictional connection there with the inner wall 33. As a result, the switching device 11, together with the released braking device 10 and thus also with the tool shaft 7, is connected to the bevel gear 23 of the transmission 21 in a rotationally fixed manner, via which the motion produced by the drive 3 is transmitted through the transmission 21 to the tool 8 connected to the tool shaft 7.

If the handheld power tool 1 is now switched off by the user, a greater deceleration occurs in the region of the abrasive disk 9 than at the drive 3 of the hand-held power tool 1. As a result, the frictional connection between the switch 12 and the inner wall 33 of the axial section 32 formed on the bevel gear 23 is released, and a limited relative rotation takes place between the switching ring 15 and the freewheel inner ring 14, causing the switch 12 on the applicable control cams 13 to be moved from the first seats 24 into the second seats 25. This brings about a likewise limited relative rotation between the freewheel inner ring 14 and the brake sleeve 19, as a result of which the inclined surfaces 40, which are formed on the drive cams 26 that constitute the cam mechanism 27 and on the corresponding mating cams 28, cause the brake sleeve 19—specifically, an opposite surface 37 formed on the face of the brake sleeve 19 —, which is connected to the tool shaft 7 in a rotationally fixed manner by a spacer sleeve 39, to be moved axially in the direction of a braking surface 36 formed on the housing 5, which braking surface is implemented on a brake ring 38, which can be formed integrally with the housing 5. In this way, the braking device 10 is transferred from the release position into the braking position, as is shown in FIGS. 9 and 10, with the assistance of the return element 20 acting on the brake sleeve 19. As a result, the tool shaft 7 decoupled from the output 6 is braked while the drive 3 and the output 6 can decelerate.

When the hand-held power tool 1 is switched on, the starting of the drive 3 causes a switching impulse to be transmitted from the output 6 to the switching device 11. This is accomplished here, in particular, by the switch 12, which in the second switching position are initially located in the second seat 25 on the applicable control cams 13, where they can freely rotate on the inner wall 33 of the axial section 32 of the bevel gear 23. If the bevel gear 23 is now accelerated abruptly by the switching on of the drive 3, then the switch 12, and thus also the switching ring 15, are carried along. In this case, a relative rotation occurs between the switch 12 or the switching ring 15 and the freewheel inner ring 14, causing each of the switch 12 to be moved from the second seat 25 into the first seat 24, by which the first switching position is defined. This brings about a frictional connection between the switch 12 and the output 6, causing the switching device 11 to be coupled to the output 6 in a rotationally fixed manner. As a result, a limited relative rotation again takes place between the freewheel inner ring 14 and the brake sleeve 19, which is part of the braking device 10. This limited relative rotation, in turn, causes the brake sleeve 19 to be moved axially in opposition to the force of the return element 20 from the braking position in the direction of the bevel gear 23 into the release position by means of the cam mechanism 27, which is composed of the drive cams 26, which are associated on the inner circumferential side with the freewheel inner ring 14, and of the mating cams 28 formed on the outer circumferential side on the brake sleeve 19. To this end, corresponding mutually interacting inclined surfaces 40 are formed on the drive cams 26 and on the mating cams 28. In this process, the opposite surface 37, which is formed on the brake sleeve 19, is released from the braking surface 36 that is formed on the brake ring 38 and that is associated with the housing 5. In the process, the brake sleeve 19 is moved axially against the contact surface 35 formed on the base 30 of the bevel gear 23 and is clamped between the drive cams 26 and the contact surface 35. Because the brake sleeve 19 is connected to the tool shaft 7 in a rotationally fixed manner, a frictional connection is thus ultimately produced between the output 6 and the tool shaft 7, which is transmitted from the bevel gear 23 of the output 6 through the switching device 11 and the braking device 10 to the tool shaft 7. Consequently, in the first switching position of the switching device 11 the tool shaft 7 is connected to the output 6 in a rotationally fixed manner, and the braking device 10 is released, until the drive 3 of the hand-held power tool 1 is switched off again.

Figure 11:
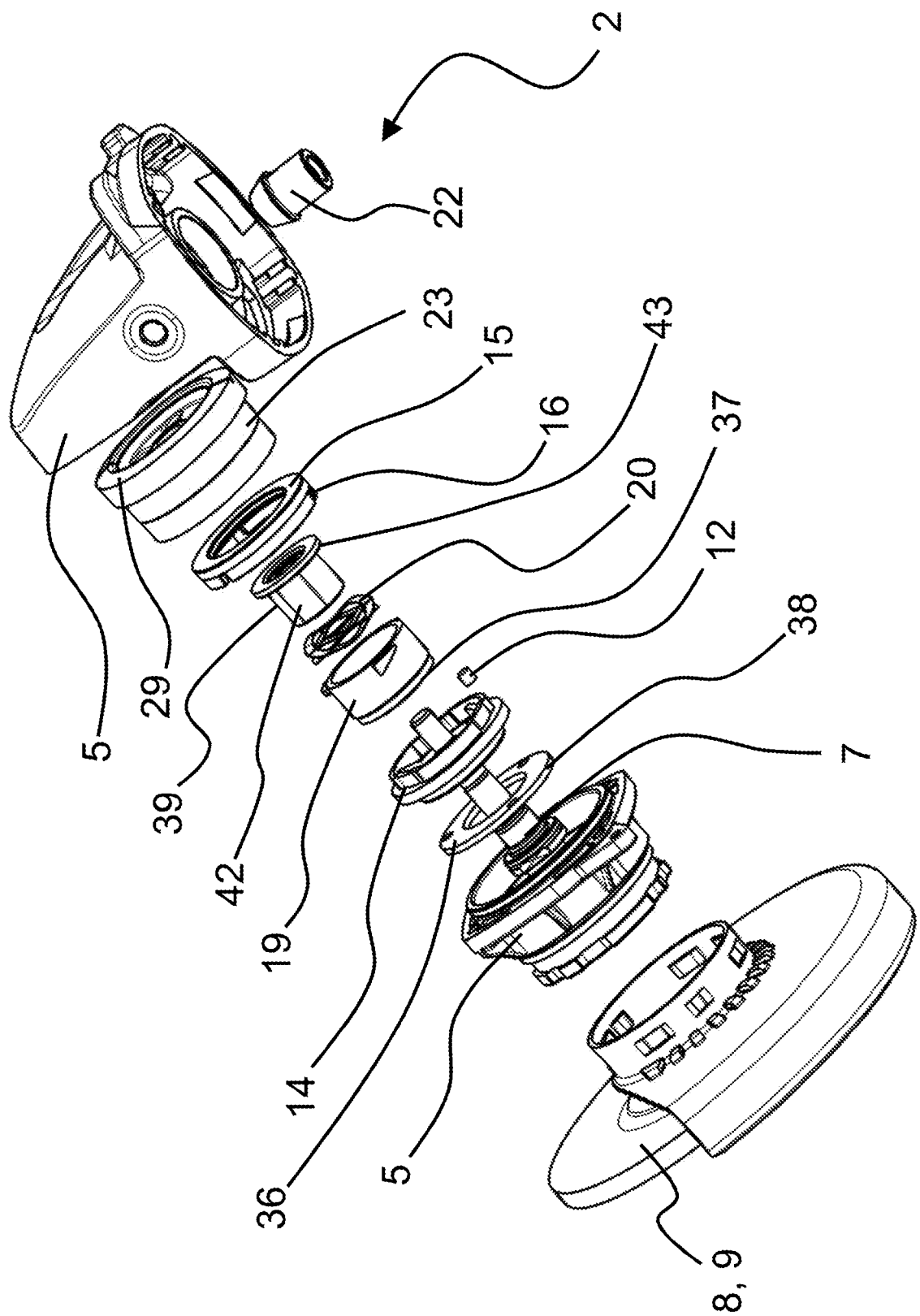
FIG. 11 is an exploded view of the gearhead.

The construction of the gearhead 2 can be seen again in the exploded view shown in FIG. 11, in particular. Attention is drawn here, in particular, to the fact that the housing 5 is designed in two parts. In this design, the part of the housing 5 facing the tool 8 accommodates the brake ring 38, which has, on its face that is turned away from the tool 8, the braking surface 36 on which the corresponding opposite surface 37 of the brake sleeve 19 acts in the second switching position in order to brake the tool 8 or the tool shaft 7. In the exemplary embodiment shown, the brake ring 36 is secured on the housing 5 by a screw connection. However, provision is also made within the scope of the invention, in particular, that the brake ring 38 is designed as an integral component of the housing 5. The spacer sleeve 39 is connected to the tool shaft 7 in a rotationally fixed and axially immovable manner. This is achieved by pressing the spacer sleeve 39 onto the tool shaft 7. The spacer sleeve 39 has straight surfaces 42 that interact with the brake sleeve 19 to join the two components to one another in a rotationally fixed manner. At the same time, however, the brake sleeve 19 is supported so as to be axially movable on the spacer sleeve 39 and thus ultimately on the tool shaft 7, and therefore can be moved axially between the braking position and the release position. Supported on a collar 43 of the spacer sleeve 39 in this design is the return element 20 in the form of a set of wave springs, which acts on the brake sleeve 19 and exerts a force thereon that is oriented in the direction of the brake ring 38. The inclined surfaces 40 of the mating cams 28 of the brake sleeve 19 contact the inclined surfaces 40 of the drive cams 26 of the freewheel inner ring 14 so that a relative rotation between the freewheel inner ring 14—which is rotatably mounted on the housing 5—and the brake sleeve 19 brings about an axial movement of the brake sleeve relative to the freewheel inner ring 14. The switching elements 12 are guided in the control cams 13 of the freewheel inner ring 14, and then extend through the openings 16 of the switching ring 15 overlapping the freewheel inner ring 14 so as to form a frictional connection to the inner wall 33 of the axial section 32 of the bevel gear 23 in the first switching position.

The invention being thus described, it will be obvious that the same may be varied in many ways. Such variations are not to be regarded as a departure from the spirit and scope of the invention, and all such modifications as would be obvious to one skilled in the art are to be included within the scope of the following claims:

What is claimed is:

1. A gearhead for a handheld power tool for machining workpieces, the gearhead comprising:
    a housing in which an output connectable to a drive of the hand-held power tool is accommodated;
    a tool shaft to which a tool is adapted to be coupled;
    a braking device movable between a braking position and a release position and that acts upon the tool shaft for braking the tool shaft; and
    a switching device movable between a first switching position, in which the tool shaft is connected to the output in a power transmitting manner and in which the braking device is transferred into the release position, and a second switching position, in which the tool shaft is decoupled from the output and in which the braking device is transferred into the braking position,
    wherein the switching device includes at least one radially movable switch, which is accommodated in a control cam that is formed on a freewheel inner ring and that is delimited by a first seat defining the first switching position and a second seat defining the second switching position.

2. The gearhead according to claim 1, wherein the switching device interacts with the output such that the switching device is moved between the first switching position and the second switching position by a mechanical switching impulse induced by the output.

3. The gearhead according to claim 1, wherein the at least one radially movable switch located in the first seat in the first switching position is frictionally connected to the output.

4. The gearhead according to claim 1, wherein the switching device includes a switching ring that surrounds the freewheel inner ring and that has, on an outer circumferential side, at least one radial opening that provides a retaining function for the at least one radially movable switch, wherein the at least one radially movable switch passes radially through the at least one radial opening in the first switching position.

5. The gearhead according to claim 4, wherein a radially inward-pointing overlap section is associated with the switching ring.

6. A gearhead for a handheld power tool for machining workpieces, the gearhead comprising:
    a housing in which an output connectable to a drive of the handheld power tool is accommodated;
    a tool shaft to which a tool is adapted to be coupled;
    a braking device movable between a braking position and a release position and that acts upon the tool shaft for braking the tool shaft; and
    a switching device movable between a first switching position, in which the tool shaft is connected to the output in a power transmitting manner and in which the braking device is transferred into the release position, and a second switching position, in which the tool shaft is decoupled from the output and in which the braking device is transferred into the braking position,
    wherein the braking device includes a brake sleeve that is connected to the tool shaft in a rotationally fixed manner and that is moved axially relative to the tool shaft between the release position and the braking position.

7. The gearhead according to claim 6, wherein a return element is provided that exerts a restoring force on the brake sleeve in the release position of the braking device.

8. The gearhead according to claim 1, wherein the switching device has a cam mechanism for moving the braking device between the release position and the braking position.

9. The gearhead according to claim 8, wherein the braking device includes a brake sleeve that is connected to the tool shaft in a rotationally fixed manner and that is moved axially relative to the tool shaft between the release position and the braking position, and wherein the cam mechanism includes at least one axial drive cam formed on the freewheel inner ring for interacting with a mating cam formed on the brake sleeve.

10. The gearhead according to claim 6, wherein the braking device has a braking surface associated with the housing and an opposite surface associated with the brake sleeve for interacting with the braking surface.

11. The gearhead according to claim 10, wherein the braking surface is arranged on a brake ring that is connected to the housing in a rotationally fixed manner.

12. The gearhead according to claim 6, wherein a spacer sleeve forming an axial guide for the brake sleeve is provided that is connected in a rotationally fixed and axially immovable manner to the tool shaft.

13. The gearhead according to claim 1, wherein the output includes a transmission having a bevel-gear drive and a bevel gear.

14. A handheld power tool comprising a drive and also having a gearhead according to claim 1.

15. The gearhead according to claim 5, wherein the radially inward-pointing overlap section is an annular shoulder.

\* \* \* \* \*